Patented Aug. 28, 1951

2,566,241

UNITED STATES PATENT OFFICE 2,566,241

REACTION PRODUCT OF PHOSPHORUS SULFIDE-POLYOLEFIN-OXYGEN CONTAINING ORGANIC COMPOUND AND MINERAL OIL COMPOSITIONS CONTAINING SAME

John M. Musselman, South Euclid, Ohio, assignor to The Standard Oil Company, Cleveland, Ohio, a corporation of Ohio No Drawing. Application May 27, 1948,
Serial No. 29,662

16 Claims. (Cl. 252—46.7)

This invention relates to lubricants and lubricant additives comprising a reaction product of an oxygen-containing organic compound, a high molecular weight poly-olefin and a phosphorus sulfide reacted together. Lubricants, such as oils and greases, comprising reaction products of this type are relatively non-corrosive and non-lacquer forming, and at the same time have improved viscosity index characteristics.

Such lubricants are suitable for use under various conditions, including high temperatures or high pressure or both; as, for instance, use in an internal combustion engine operating at high temperatures and in which the lubricant is in close contact with metallic surfaces, metal compounds and high temperature gases. They are also suitable as extreme pressure lubricant agents in oils and greases.

The art is acquainted with the use of high molecular weight olefin polymers as agents for improving the viscosity index of lubricants, particularly lubricating oils and the measurement of the molecular weight thereof (see article in Industrial and Engineering Chemistry, volume 39, starting at page 1676, re "Paratone"). Such agents have substantially no effect upon the corrosion, lacquer, sludge, and the like characteristics of lubricating oils; and it is recommended in the technical literature that additional agents, the so-called "additives," be added if it is necessary to improve the latter characteristics.

The art is familiar with various agents for improving the oxidation stability and corrosion characteristics of lubricating oils and greases. A suitable agent of this type may be prepared by reacting an oxygenated organic compound such as degras or lanolin with a phosphorus sulfide such as the pentasulfide. This reaction product may be reacted with a metal compound to form the corresponding metal derivative such as the sodium, calcium or barium derivative. Where it is desired to improve both the viscosity index as well as the oxidation stability, corrosion and the like characteristics of the lubricating oil, both additives are usually included. The art is confronted with a problem of finding a single additive which will improve all of the characteristics of the oil, especially at a commerically interesting cost.

In accordance with the invention, it has been found that a poly-olefin (a typical viscosity index improvement additive) may be mixed with an oxygenated organic compound and reacted with phosphorus pentasulfide; and the reaction product retains the viscosity index improvement characteristics of the poly-olefin, and also improves the oxidation stability and corrosion characteristics of lubricating oil to which it is added. In addition, the amount of oxygenated organic compound required in the reaction for a given antioxidant stability is but a fraction of the amount required when the phosphorus sulfide reaction product with the oxygenated organic compound is added to the oil separately from the poly-olefin additive. These reaction products have good solubility in oils and greases.

The reaction products of the invention are to be distinguished from a mere mixture of the poly-olefin with the reaction product of the phosphorus sulfide and oxygenated organic compound, and are superior to such a mixture. This suggests that the reaction product of the invention is not merely a mixture of the reaction product of the oxygenated organic compound and the sulfide-containing poly-olefin, but rather that there is a chemical interaction giving an unexpectedly superior product.

The objects achieved in accordance with the invention include the provision of an agent which may be useful itself as a lubricant, and which when added to lubricants will improve the viscosity index and also markedly inhibit the very objectionable deposition of lacquer, and, at the same time, inhibit acid and sludge formation, corrosion and other types of deterioration occurring under operating conditions; the provision of lubricating oils containing such an addition agent; and other objects which will be apparent as embodiments of the invention are disclosed hereinafter.

The reaction product may be made with direct admixture of the reactants, or, if desired, by their admixture in the presence of a diluent which may or may not be subsequently removed. A heavy oil such as white oil, or a lubricating oil having about the same properties as that to which the new composition is to be added may be used as a diluent. Oil may be added after the reaction such as during a subsequent filtration. The reaction is usually complete in about 10 hours or less time, generally 1 to 2 hours. The reaction time is a function of the temperature, the amount of the sulfide that is to react, the subdivision of the reactants, the efficiency of mixing, etc.

The mixture of poly-olefin and oxygen-containing organic compound may be reacted with the phosphorus sulfide or a mixture of phosphorus sulfides in ratios from 5 to about 60 weight per cent of the phosphorus sulfide based on the weight of the above mixture, depending on the type of mixture. Generally about 10 to about 50 per cent is the usual range that will be used, depending on the molecular weight of the poly-olefin and its proportions relative to the oxygen-containing organic compound, and about 10 to about 20 per cent is especially desirable.

Phosphorus pentasulfide is preferred although other phosphorus sulfides or mixtures of sulfides may be employed. Phosphorus pentasulfide is most economic and readily available and for this reason is used in the illustrative examples.

The poly-olefin which may be used is one which improves the viscosity index of lubricating oil, e. g., one having a molecular weight of about 2,000 to 100,000 and which is soluble in lubricating oil. These materials are substantially saturated as the art will appreciate. As mentioned above, such materials are known in the art. The commercially available material is known as "Paratone" which is a polyisobutylene polymer of 10,000 to 20,000 molecular weight in such amount in a solution of oil as to give a viscosity of about 3,000 S. S. U. at 210° F.

An ester wax such as degras, lanolin or sperm oil is a preferred oxygen-containing organic compound. In the broader aspects of the invention, there may be used such a compound containing hydroxy, carbonyl, or ether oxygen, and desirably one of rather high molecular weight, preferably boiling above the reaction temperature. The reaction may be conducted under pressure, if desired, in the case of lower boiling materials. There may be used esters, as alkyl or cycloparaffin or aryl esters of organic acids; fatty oils, higher alcohols, higher carboxylic acids, saturated and unsaturated, mono-basic and dibasic, petroleum acids, naphthenic acid, rosin, modified rosin, glycol ethers, higher ketones and aldehydes; also halogenated derivatives of any of these. Illustrative of some conveniently applicable materials are: beeswax, lanolin, sperm oil, other waxes, butyl stearate, ethyl lactate, methyl oleate, butyl ricinoleate, butyl phthalate, methyl stearate, methyl dichlorostearate, methyl chloro-naphthenate, dichloro-palmitic acid, coconut oil, babassu oil, hydrogenated coconut and other vegetable oils, other fatty oils, ethylene glycol mono ethers, diglycol chloro-hydrin, lauryl alcohol, stearic acid, lauric acid, oleic acid, palmitic acid, myristic acid, naphthalic acid, naphthoic acid, benzoic acid, naphthenic acids, hydroxystearic acid, dihydroxybenzoic acids, hydroxynaphthenic acids, dihydroxystearic acid, chlorobenzoic acid, dichlorostearic acids, dichlorobenzoic acid, dichlorodihydroxystearic acid, lactones, palmitone, oxidized petroleum fatty acid or other petroleum product, as oxidized wax, kerosene, gas oil or other oxidized petroleum oil. The oxygenated compound used in forming the reaction product should be selected with reference to the use of the final composition and properties desired in it, e. g., to give a reaction product having oil solubility or dispersibility.

In the illustrative embodiment it is preferred to use about 3 parts by weight of the poly-isobutylene oil solution available as "Paratone" with about one part by weight of the degras or other oxygenated organic material. If the "Paratone" is assumed to be a 40% to 50% solution in oil, this would be about 1.2 to 1.5 parts of the poly-isobutylene to one part of degras. However, widely different proportions show significant improvements and an amount of poly-olefin in the range of 1 to 10 parts by weight to one part of the oxygenated material is desirable.

The reaction may be carried out in the presence or absence of air, or in the atmosphere of inert or non-deleterious gas, such as nitrogen or $H_2S$. It may also be carried out under pressure, e. g., the pressure generated when the reaction is carried out in a closed vessel.

A reaction temperature varies with poly-olefin and oxygen-containing compound and is readily ascertained. The optimum is in the range of 225° to 500° F., although a higher temperature which is below that at which the reaction product would be decomposed could be used. A temperature of at least 250° to 300° F. is preferred in many cases.

The final reaction mass is preferably centrifuged, filtered or settled and decanted in order to remove the by-product sludge, or other insoluble material. Any excess of a volatile reactant, or a volatile diluent, may be removed by distillation. If desired, the final product may be solvent extracted with a suitable solvent, e. g., liquid propane, isopropyl alcohol, acetone, and other solvent known in the art, or contacted with an adsorbent such as activated charcoal, silica gel, activated clay, and the like.

An element of the sulfur family, i. e., sulfur, selenium or tellurium, can be incorporated into the reaction product. This sulfur can be incorporated by adding elemental sulfur or a compound which yields sulfur, such as by treating the sulfide-derived reaction product therewith, or treating a derivative of the sulfide-derived reaction product therewith.

The amount of the final reaction product (i. e., the additive) to be incorporated in an oil or grease will depend upon the characteristics of the oil or grease and the intended use. Some oils have more of a tendency to corrode metals, or to form acids, sludges and lacquer deposits than others, and such oils require larger quantities of the addition agent. Also, oils that are intended for higher temperatures require larger amounts of the additive. In general, the range is from about ½ to about 10%; under some circumstances, amounts as low as about 0.01% show a significant improvement. Since the provided reaction product is a lubricant, there is no upper limit. However, it may be uneconomical to include in the lubricant more of the provided reaction product than is necessary to impart the desired properties, such as 50%.

The following examples illustrates and point out advantages of the invention:

EXAMPLE A 23 parts of $P_2S_5$ is mixed with about 30 parts of a diluent neutral oil such as a conventional Mid-Continent acid treated lubricating oil base stock, SAE 20, and added to 100 parts of degras and agitated for one hour at 300° F., and filtered. A 62.5% yield of reaction product is obtained based on total products charged. During the filtration enough oil is added to give an oil solution of equal parts of reaction product and oil. The oil solution of the reaction production analyzes 5.0% S, and 0.8% P, or 10.0% S and 1.6% P on the basis of the pure reaction product. This is referred to as the additive of Example A hereinafter. The amount of $P_2S_5$ used in this example has been found to be the optimum amount for preparing this type of additive in the manner described above.

EXAMPLE B 20 parts of $P_2S_5$ is mixed with 100 parts of a commercial viscosity index improvement additive (known as "Paratone," and essentially based on a poly-iso-butylene of average molecular weight of about 10,000 dissolved in a neutral oil) and agitated for one hour at 300° F., and then filtered. An 85% yield of product (filtrate) based on the total product is obtained and this analyzes 1.4% S, and 0.41% P. This is referred to as the additive of Example B hereinafter.

EXAMPLE 1

20 parts by weight of $P_2S_5$ is mixed with such portion of 100 parts of a neutral diluent lubricating oil as to form a slurry and this was mixed with a mixture of 25 parts of degras and 75 parts of the above-described "Paratone." The balance of the 100 parts of the neutral diluent oil is added and the mixture agitated for one hour at 300° F., and settled, decanted and filtered. A 92.18% yield of product (filtrate) is obtained based on all products charged. It analyzes 3.90% S, and 1.20% P or 7.8% S and 2.4% P on a pure basis (excluding the neutral oil). This is referred to as the additive of Example 1 hereinafter.

The analysis of this reaction product is different than that of a mixture of 1 part of the additive of Example A with 3 parts of the additive of Example B; which mixture is calculated as analyzing 3.31% S, and 0.70% P (on a pure basis). This is summarized as follows:

|  | Per Cent S | Per Cent P |
|---|---|---|
| Example A (pure basis) | 10.0 | 1.6 |
| Example B | 1.4 | 0.41 |
| 1 part Example A, 3 parts Example B | 3.55 | 0.70 |
| Example 1 (pure basis) | 7.8 | 2.4 |

This indicates that the reaction product of the invention is different than a mixture of the separately reacted material of Example A and Example B.

Following the procedure of Example 1, the following results are obtained; using various amounts of $P_2S_5$:

| Example No. | 2 | 3 | 4 | 1 |
|---|---|---|---|---|
| Parts $P_2S_5$ | 5 | 10 | 15 | 20 |
| Yield of Product | 96.67% | 96.0% | 95.6% | 92.18% |
| Analysis of Product (on a Pure Basis) | 2.34% S<br>0.62% P | 3.90% S<br>1.30% P | 5.16% S<br>1.90% P | 7.80% S<br>2.40% P |

In testing oils containing addition agents, an Ethyl Motor is used, under the following conditions:

| | |
|---|---|
| Procedure | II |
| Type engine | Series 30 Ethyl |
| Engine speed | 1200 R. P. M. |
| Sump temp | 300° F. |
| Jacket temp | 212° F. |
| Air fuel ratio | 15 to 1 |
| Compression ratio | 7 to 1 |
| Catalyst | None |

For comparative purposes, the test values for piston skirt, acid number, naphtha insolubles, and 1/100 the viscosity increase are added; the sum multiplied by 10, and divided by the number of hours the test is run. The resulting value is termed the demerit rating.

A conventional acid treated Mid-Continent lubricating oil base stock (SAE 20) and blended compositions of this oil made in accordance with the invention were submitted to tests in accordance with the above described Ethyl Motor procedure. The base oil was identical in all runs. The results in the following tables are typical:

Table I (A).—(40 hours)

| 3% by Weight of Additive of Example No. | (A) (Pure Basis) | (B) | Mixture of 1 part of A pure basis, 3 parts of B | (1) (Pure Basis) |
|---|---|---|---|---|
| Piston Skirt Rating | 0.0 | 8.0 | 5.0 | 0.0 |
| Viscosity Increase (SUS) | 60 | 211 | 101 | 16 |
| Acid Number | 1.5 | 3.75 | 2.0 | 1.25 |
| Pentane Insolubles (in Per Cent by Weight) | 0.20 | 5.0 | 3.5 | 0.25 |

Table I (B).—(60 hours)

| 3% by Weight of Additive of Example No. | (A) (Pure Basis) | (B) | Mixture of 1 part of A pure basis, 3 parts of B | (1) (Pure Basis) |
|---|---|---|---|---|
| Piston Skirt Rating | 2.5 | stopped at 40 hours. | 8.0 | 1.5 |
| Viscosity Increase (SUS) | 120 | | 132 | 73 |
| Acid Number | 1.75 | | 2.5 | 1.75 |
| Pentane Insolubles (in Per Cent by Weight) | 1.0 | | 5.0 | 0.80 |
| Demerit Rating | 1.07 | 4.70 | 2.8 | 0.79 |
| Corrosion of Cu-Pb bearing metal (in mgms. wt. loss per bearing half-shell) | 85.0 | 123.8 | 70.3 | 68.0 |

Table II.—(60 hours)

| 3% (Pure Basis) by Weight of Additive of Example No. | (2) | (3) | (4) | (1) |
|---|---|---|---|---|
| Piston Skirt Rating | 8.0 | 6.0 | 1.5 | 1.5 |
| Viscosity Increase (SUS) | 179 | 213 | 195 | 73 |
| Acid Number | 5.25 | 1.75 | 1.5 | 1.75 |
| Pentane Insolubles (in Per Cent by Weight) | 11.0 | 3.0 | 0.8 | 0.80 |
| Demerit Rating | 4.34 | 2.15 | 0.95 | 0.79 |
| Corrosion of Cu-Pb bearing metal (in mgms. weight loss per bearing half-shell) | 160.0 | 135.5 | 66.6 | 68.0 |

The blank oil ran only 20 hours and showed a demerit rating of about 7.

It is apparent from the data of Tables I (A) and I (B) that the additive of the invention (Example 1) gives better engine test results than the comparative materials tested (Example A, Example B and mixture of one part of A with 3 parts of B). The very low demerit rating of the additive of Example (1) in Table I (B) is especially noteworthy.

The lower demerit rating of the oil containing the Example 1 additive of the invention (Table I (B)), as compared to that containing the Example A additive, is achieved with only about one-quarter the requirement of degras (to make the additive). This is reflected in a very substantial reduction in cost.

It is apparent from Table II that while 5% of $P_2S_5$ (Example 2) shows significant improvement (e. g., in demerit rating as compared to the oil alone) better results are obtained with 10% (Example 3), and optimum results are obtained with from 15% or 20% (Examples 4 and 1). While the test results for Examples 4 and 1 are rather close, Example 4 gives a slightly lower corrosion rating, and Example 1 gives a slightly lower demerit rating and a noticeably lower viscosity index characteristic. Higher proportions of $P_2S_5$ are operative; however, in view of the levelling off of the improvements in going from 15% to 20% $P_2S_5$, the use of higher amounts is not indicated as advisable from the economical viewpoint.

The effect of the various additives on the viscosity index (V. I.) of the oil can be seen from the following table:

Table III

| Column No. | I | II | III | IV | V |
|---|---|---|---|---|---|
| Amount of Neutral Oil per cent | 87 | 84 | 81 | 84 | 84 |
| Amount of Bright Stock per cent | 13 | 13 | 13 | 13 | 13 |
| Amount of "Paratone" per cent | none | none | 3 | none | none |
| Additive of Example No. and Amount per cent | none | 3 "A" | 3 "A" | 3 "B" | 3 "1" |
| Viscosity Index | 85 | 85 | 96 | 95.6 | 94.2 |

From columns I and II it will be seen that the oil without "Paratone" or other additives has a V. I. of 85, and that the prior art additive of Example A used in only an amount of 3% does not improve the V. I.

Column III shows the effect of adding "Paratone" to the example of column II, in that it raises the V. I. to 96, as would be expected by the inclusion of "Paratone."

When 3% of Example B is added, the V. I. is 96.5 as shown in column IV, which is about the same as the V. I. in column III, which might be expected.

Column V shows the V. I. effect of the additive of the invention. Only three-fourths as much "Paratone" is used in making the additive of Example 1 as is used in making the additive of Example B, and the V. I. improvement of the oil with the additive of Example 1 might therefore be expected to be three-fourths of the way from a V. I. of 85 to 95.6 or 92.9. However, as is seen from column V, the V. I. of the oil with the additive of Example 1 made according to the invention, exceeds this figure. This shows that the viscosity index improvement characteristics of the "Paratone" are retained, and even improved, in the reaction product of the invention.

In addition to the foregoing, commercial lubricating oils containing the additives of the invention are superior in color and odor to such oils containing the mixture of additives indicated above, and this if of considerable commercial importance. In addition, the process of blending the oil is simplified, because only one addition agent is necessary to accomplish two separate functions.

In order to demonstrate that the invention is not limited to a reaction product using degras as the oxygen-containing compound, the following examples were prepared using myristic acid instead of degras.

EXAMPLE A'

Following the general procedure outlined under Example A, 35 parts of $P_2S_5$ is reacted with 100 parts of myristic acid. This amount of $P_2S_5$ has been found to be the optimum amount for preparing this type of additive from myristic acid as the base material. The reaction is carried out at 300° F. for one hour and diluted with oil so as to provide equal parts of the reaction product and oil as explained in Example A.

EXAMPLE B'

20 parts of $P_2S_5$ is reacted with 100 parts of "Paratone" exactly as described under Example B.

EXAMPLE 2

20 parts by weight of $P_2S_5$ is reacted with 25 parts of myristic acid and 75 parts of "Paratone," following the general procedure outlined under Example 1. The reaction mixture is diluted with oil so as to have an equal part of oil as in Example 1. The reaction is carried out for one hour at 300° F. and the reaction product settled, decanted, and filtered as explained under Example 1.

Each of the additives of Example A', Example B' and Example 2 was added to an oil in the same amount (3% on a pure basis) and 0.75% of Example A' and 2.25% of Example B' was also added to the same oil. These four oil blends were tested in an Ethyl Motor using Procedure II exactly as described heretofore.

The following table includes the analysis of the additives, the viscosity index, the oil used and the results of the Ethyl Motor operation:

Table IV

| Additive of Example No. | A' | B' | 2 | A' and B' | None |
|---|---|---|---|---|---|
| Yield, per cent | 81.6 | 85 | 88 | | |
| Additive Analysis, per cent Sulfur (Pure Basis) | 19.52 | 1.4 | 11.24 | 5.93 | |
| Per Cent Phosphorus (Pure Basis) | 1.54 | .41 | 2.54 | .68 | |
| Oil Blend: | | | | | |
| Per Cent Neutral Oil | 84 | 84 | 84 | 84 | 87 |
| Per Cent Bright Stock | 13 | 13 | 13 | 13 | 13 |
| Per Cent Additive | 3 | 3 | 3 | {0.75% of A' / 2.25% of B'} | none |
| Viscosity Index | 84 | 95.6 | 97 | 98 | 85 |
| Ethyl Motor Operation, Hours Run | 40 | 40 | 40 | 40 | 20 |
| Per Cent Sludge | 0.60 | 5.0 | 0.45 | 1.5 | 2.0 |
| Acid No | 2.25 | 3.75 | 1.0 | 2.0 | 2.25 |
| Viscosity Increase, SSU/100° F. | 97.0 | 211.0 | 25.0 | 75.0 | 169 |
| Piston Skirt Rating | 1.5 | 8.0 | 0.0 | 2.0 | 8.0 |
| Demerit Rating | 1.33 | 3.97 | 0.42 | 1.56 | 7.0 |

In order to demonstrate the applicability of the invention to additional oxygenated compounds, the following examples are included with four different oxygenated compounds:

EXAMPLE 3

20 parts of $P_2S_5$ was reacted with 25 parts of "Spermafol No. 52" and 75 parts of "Paratone" using the procedure described under Examples 1 and 2. "Spermafol No. 52" is hydrogenated sperm oil and has an iodine value of 6 to 7, a melting point of 50–52° C., a free fatty acid content (as oleic) of 1 to 2% and a saponification value of 135–138. The reaction is continued for one hour at 300° F. and an equal amount of oil is added to the reaction product before, during the reaction and during the filtering as explained in Examples 1 and 2.

EXAMPLE 4

Following the procedure of Example 3, 20 parts of P$_2$S$_5$ is reacted with 25 parts of "Alox No. 152" and 75 parts of "Paratone." "Alox No. 152" is an oxidation product of paraffin wax, and includes a mixture of alcohols, acids, ketones and other oxidation products of paraffin. It is described in Patent No. 2,419,325 and is well known to the art. The procedure is the same as that described in the previous examples.

EXAMPLE 5

20 parts of P$_2$S$_5$ is reacted with 25 parts of "Palmitone" and 75 parts of "Paratone." "Palmitone" is the trade name for (C$_{15}$H$_{31}$)$_2$CO. The reaction conditions and the procedure are the same as that described in the previous examples.

EXAMPLE 6

20 parts of P$_2$S$_5$ is reacted with 25 parts of lauryl alcohol and 75 parts of "Paratone." The reaction conditions and the procedure are identical with those described previously.

Each of the additives of Examples 3, 4, 5 and 6 was added to an oil in an amount of 3% (on a pure basis) and tested in an Ethyl Motor using the same procedure as described heretofore. The following table is a summary of the additive analysis, oil blend, viscosity index, and the results of the Ethyl Motor operation:

Table V

| Additive of Example No. | None | 3 | 4 | 5 | 6 |
|---|---|---|---|---|---|
| Yield, Per Cent | | 91 | 89.7 | 94.8 | 96.5 |
| Additive Analysis, Per Cent Sulfur (Pure Basis) | | 7.98 | 6.62 | 9.14 | 7.04 |
| Per Cent Phosphorus (Pure Basis) | | 1.92 | 1.68 | 2.54 | 2.88 |
| Oil Blend: | | | | | |
| Per Cent Natural Oil | 87 | 84 | 84 | 84 | 84 |
| Per Cent Bright Stock | 13 | 13 | 13 | 13 | 13 |
| Per Cent Additive | none | 3 | 3 | 3 | 3 |
| Viscosity Index | 85 | 99 | 98 | 95 | 98 |
| Ethyl Motor Operation, Hours Run | 20 | 20 | 20 | 20 | 20 |
| Per Cent Sludge | 2.0 | 0.2 | 0.2 | 0.2 | 0.2 |
| Acid No | 2.25 | 0.75 | 0.5 | 1.0 | 1.25 |
| Viscosity Increase, SSU/100° F | 169 | 31.0 | 27.0 | 17.0 | 34.0 |
| Piston Skirt Rating | 8.0 | 0.0 | 0.0 | 0.0 | 0.0 |
| Demerit Rating | 7.0 | 0.63 | 0.48 | 0.68 | 0.89 |

Following the above-described procedures, except using another poly-olefin or another oxygenated material, or both, as discussed hereinbefore, comparable results are obtained; and in view of the foregoing description, the art will clearly understand the invention in its broad aspects including variations and modifications thereof.

If desired, the additives of the invention may be used together with the other oil addition agents, e. g., pour point depressants or film strength agents. In some instances, it is desirable to include in a lubricating oil containing the additive an agent for improving the clarity of the oil, e. g., lecithin, lauryl alcohol, and the like, which are known to the art. In order to prevent foaming of the oil containing a small proportion of the additive, it is desirable in some cases to add a very small amount of tetra-amyl silicate, an alkyl ortho carbonate, ortho formate or ortho acetate, or a polyalkylsilicone oil, which prevent foaming upon the bubbling of air through oil containing a few per cent of the additive.

It is intended to claim the invention broadly, except as limited by the following claims.

I claim:

1. As an oil dispersible composition for inhibiting deterioration of organic compounds, a simultaneous reaction product of 5 to 60% by weight of a phosphorus sulfide and 95 to 40% of a mixture of one part by weight of an oxygen-containing organic compound selected from the group consisting of those compounds containing hydroxy, carbonyl, ether and carboxy radicals, and having a boiling point of at least 225° F. with 1 to 10 parts of a poly-olefin capable of improving the viscosity index characteristic of a lubricating oil, reacted together at a temperature in the range of 225° to 500° F.

2. As an oil dispersible lubricant, a simultaneous reaction product of 5 to 60% by weight of phosphorus pentasulfide and 95 to 40% of a mixture of one part by weight of an oxygen-containing organic compound selected from the group consisting of those compounds containing hydroxy, carbonyl, ether and carboxy radicals, and having a boiling point of at least 225° with 1 to 10 parts of a poly-olefin capable of improving the viscosity index characteristic of a lubricating oil, reacted together at a temperature in the range of 225° to 500° F.

3. As an oil dispersible lubricant, a simultaneous reaction product of 5 to 60% by weight of phosphorus pentasulfide and 95 to 40% of a mixture of one part by weight of an hydroxyl oxygen-containing organic compound having a boiling point of at least 225° F. with 1 to 10 parts of a poly-iso-butylene capable of improving the viscosity index characteristic of a lubricating oil, reacted together at a temperature in the range of 225° to 500° F.

4. As an oil dispersible lubricant, a simultaneous reaction product of 5 to 60% by weight of phosphorus pentasulfide and 95 to 40% of a mixture of one part by weight of a carbonyl oxygen-containing organic compound having a boiling point of at least 225° F. with 1 to 10 parts of a poly-iso-butylene capable of improving the viscosity index characteristic of a lubricating oil, reacted together at a temperature in the range of 225° to 500° F.

5. As an oil dispersible lubricant, a simultaneous reaction product of 5 to 60% by weight of phosphorus pentasulfide and 95 to 40% of a mixture of one part by weight of an ether oxygen-containing organic compound having a boiling point of at least 225° F. with 1 to 10 parts of a poly-iso-butylene capable of improving the viscosity index characteristic of a lubricating oil, reacted together at a temperature in the range of 225° to 500° F.

6. A lubricant comprising a mineral lubricating oil and an amount in the range of 0.01 to 50% by weight sufficient to improve the viscosity index and the demerit rating characteristics thereof of an oil dispersible simultaneous reaction product of 5 to 60% by weight of a phosphorus sulfide, and 95 to 40% of a mixture of one part by weight of an oxygen-containing organic compound selected from the group consisting of those compounds containing hydroxy, carbonyl, ether and carboxy radicals, and having a boiling point of at least 225° F. with 1 to 10 parts of poly-olefin capable of improving the viscosity index characteristic of a lubricating oil, reacted together at a temperature in the range of 225° to 500° F.

7. A lubricant comprising a mineral lubricating oil and an amount in the range of 0.01 to 50% by weight sufficient to improve the viscosity index and the demerit rating characteristics thereof of an oil dispersible simultaneous reaction product of 5 to 60% by weight of phosphorus pentasulfide and 95 to 40% of a mixture of one part by weight of an oxygen-containing organic compound selected from the group consisting of those compounds containing hydroxy, carbonyl, ether and carboxy radicals, and having a boiling point of at least 225° with 1 to 10 parts of a polyolefin capable of improving the viscosity index characteristic of a lubricating oil reacted together at a temperature in the range of 225° to 500° F.

8. A lubricant comprising a mineral lubricating oil and an amount in the range of 0.01 to 50% by weight sufficient to improve the viscosity index and the demerit rating characteristics thereof of an oil dispersible simultaneous reaction product of 5 to 60% by weight of phosphorus pentasulfide and 95 to 40% of a mixture of one part by weight of an hydroxyl oxygen-containing organic compound having a boiling point of at least 225° F. with 1 to 10 parts of a poly-iso-butylene capable of improving the viscosity index characteristic of a lubricating oil, reacted together at a temperature in the range of 225 to 500° F.

9. A lubricant comprising a mineral lubricating oil and an amount in the range of 0.01 to 50% by weight sufficient to improve the viscosity index and the demerit rating characteristics thereof of an oil dispersible simultaneous reaction product of 5 to 60% by weight of phosphorus pentasulfide and 95 to 40% of a mixture of one part by weight of a carbonyl oxygen-containing organic compound having a boiling point of at least 225° F. with 1 to 10 parts of a poly-iso-butylene capable of improving the viscosity index characteristic of a lubricating oil, reacted together at a temperature in the range of 225 to 500° F.

10. A lubricant comprising a mineral lubricating oil and an amount in the range of 0.01 to 50% by weight sufficient to improve the viscosity index and the demerit rating characteristics thereof of an oil dispersible simultaneous reaction product of 5 to 60% by weight of phosphorus pentasulfide and 95 to 40% of a mixture of one part by weight of an ether oxygen-containing organic compound having a boiling point of at least 225° F. with 1 to 10 parts of a poly-iso-butylene capable of improving the viscosity index characteristic of a lubricating oil, reacted together at a temperature in the range of 225 to 500° F.

11. A lubricant comprising a mineral lubricating oil and an amount in the range of 0.01 to 50% by weight sufficient to improve the viscosity index and the demerit rating characteristics thereof of an oil dispersible simultaneous reaction product of 5 to 60% by weight of phosphorus pentasulfide and 95 to 40% of a mixture of one part by weight of an ester type wax having a boiling point of at least 225° F. with 1 to 10 parts of poly-iso-butylene of about 10,000 average molecular weight and capable of improving the viscosity index characteristic of a lubricating oil, reacted together at a temperature in the range of 225 to 500° F.

12. A lubricant comprising a mineral lubricating oil and an amount in the range of 0.01 to 50% by weight sufficient to improve the viscosity index and demerit rating characteristics thereof of an oil dispersible simultaneous reaction product of 15 to 25 parts by weight of phosphorus pentasulfide, and a mixture of 20 to 30 parts by weight of an ester type wax, and 50 to 100 parts by weight of a poly-iso-butylene of about 10,000 average molecular weight and capable of improving the viscosity index of a lubricating oil, reacted together at a temperature in the range of 225 to 500° F.

13. A lubricant comprising a mineral lubricating oil and an amount in the range of 0.01 to 50% by weight sufficient to improve the viscosity index and the demerit rating characteristics thereof of an oil dispersible simultaneous reaction product of 5 to 60% by weight of phosphorus pentasulfide and 95 to 40% of a mixture of one part by weight of degras with 1 to 10 parts of a poly-isobutylene of about 10,000 average molecular weight and capable of improving the viscosity index characteristic of a lubricating oil, reacted together at a temperature in the range of 225 to 500° F.

14. A lubricant comprising a mineral lubricating oil and an amount in the range of 0.01 to 50% by weight sufficient to improve the viscosity index and demerit rating characteristics thereof of an oil dispersible simultaneous reaction product of 15 to 25 parts by weight of phosphorus pentasulfide, and a mixture of 20 to 30 parts by weight of degras and 50 to 100 parts by weight of a poly-iso-butylene of about 10,000 average molecular weight and capable of improving the viscosity index of a lubricating oil, reacted together at a temperature in the range of 225 to 500° F.

15. As an oil dispersible lubricant, a simultaneous reaction product of 5 to 60% by weight of phosphorus pentasulfide and 95 to 40% of a mixture of one part by weight of an oxygen-containing organic compound containing an ester radical and having a boiling point of at least 225° F., with 1 to 10 parts of a polyisobutylene capable of improving the viscosity index characteristic of a lubricating oil, reacted together at a temperature in the range of 225° to 500° F.

16. A lubricant comprising a mineral lubricating oil and an amount in the range of 0.01 to 50% by weight sufficient to improve the viscosity index and the demerit rating characteristics thereof of an oil dispersible simultaneous reaction product of 5 to 60% by weight of phosphorus pentasulfide and 95 to 40% of a mixture of one part by weight of an oxygen-containing organic compound containing an ester radical and having a boiling point of at least 225° F., with 1 to 10 parts of a polyisobutylene capable of improving the viscosity index characteristic of a lubricating oil, reacted together at a temperature in the range of 225° to 500° F.

JOHN M. MUSSELMAN.

REFERENCES CITED

The following references are of record in the file of this patent:

UNITED STATES PATENTS

| Number | Name | Date |
|---|---|---|
| 2,316,090 | Kelso | Apr. 6, 1943 |
| 2,331,923 | Musselman | Oct. 19, 1943 |
| 2,386,222 | Lincoln et al. | Oct. 9, 1945 |
| 2,405,608 | Rogers | Aug. 13, 1946 |
| 2,480,296 | Burk | Aug. 30, 1949 |
| 2,494,592 | Smyers et al. | Jan. 17, 1950 |